(12) United States Patent
Chen et al.

(10) Patent No.: US 8,913,574 B2
(45) Date of Patent: Dec. 16, 2014

(54) CHANNEL STATE INFORMATION FEEDBACK METHOD AND USER EQUIPMENT

(75) Inventors: Yijian Chen, Shenzhen (CN); Jun Xu, Shenzhen (CN); Guanghui Yu, Shenzhen (CN); Bo Dai, Shenzhen (CN); Junfeng Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 89 days.

(21) Appl. No.: 13/512,964

(22) PCT Filed: Jun. 29, 2010

(86) PCT No.: PCT/CN2010/074743
§ 371 (c)(1),
(2), (4) Date: May 31, 2012

(87) PCT Pub. No.: WO2011/085581
PCT Pub. Date: Jul. 21, 2011

(65) Prior Publication Data
US 2012/0236817 A1    Sep. 20, 2012

(30) Foreign Application Priority Data

Jan. 12, 2010  (CN) .......................... 2010 1 0002248

(51) Int. Cl.
| | |
|---|---|
| H04W 72/02 | (2009.01) |
| H04W 4/00 | (2009.01) |
| H04B 7/04 | (2006.01) |
| H04L 1/00 | (2006.01) |
| H04B 7/02 | (2006.01) |
| H04B 7/06 | (2006.01) |

(52) U.S. Cl.
CPC ............ *H04B 7/0417* (2013.01); *H04B 7/0486* (2013.01); *H04L 1/0026* (2013.01); *H04L 1/0029* (2013.01); *H04B 7/024* (2013.01); *H04B 7/0626* (2013.01); *H04B 7/063* (2013.01); *H04L 1/0003* (2013.01); *H04B 7/0632* (2013.01); *H04B 7/0639* (2013.01); *H04B 7/0641* (2013.01)
USPC .......................................... 370/329; 370/341

(58) Field of Classification Search
USPC .................................................. 370/252, 329
See application file for complete search history.

(56) References Cited

U.S. PATENT DOCUMENTS 8,271,043 B2 * 9/2012 Kim et al. .................. 455/562.1
8,406,332 B2 * 3/2013 Bayesteh et al. ............. 375/267

(Continued)

FOREIGN PATENT DOCUMENTS

| CN | 1946000 A | 4/2007 |
|---|---|---|
| CN | 101124759 A | 2/2008 |

(Continued)

OTHER PUBLICATIONS

International Search Report for PCT/CN2010/074743.

(Continued)

*Primary Examiner* — Edan Orgad
*Assistant Examiner* — Emmanuel Maglo
(74) *Attorney, Agent, or Firm* — McClure, Qualey & Rodack, LLP

(57) ABSTRACT

A method for feeding back channel state information and user equipment are provided in the present invention, which relates to the digital communication field; and they solve the problem of lacking a mechanism of reporting overall and effective channel state information in a SU-MIMO and MU-MIMO dynamic switching system. The method includes: in a single transmission mode, UE sends the channel state information to a network side, wherein the channel state information includes information indicating a transmission layer with the best channel quality. Technical schemes provided in the present invention are applied to the LTE system and LTE-A system.

8 Claims, 5 Drawing Sheets

(56) References Cited

U.S. PATENT DOCUMENTS

| | | | |
|---|---|---|---|
| 8,599,777 B2* | 12/2013 | Vitthaladevuni et al. | 370/329 |
| 8,699,429 B2* | 4/2014 | Zhou et al. | 370/329 |
| 8,824,601 B2* | 9/2014 | Malladi | 375/340 |
| 2007/0254603 A1 | 11/2007 | Li et al. | |
| 2008/0032633 A1* | 2/2008 | Harrison et al. | 455/69 |
| 2009/0232239 A1* | 9/2009 | Ko et al. | 375/260 |
| 2011/0176629 A1* | 7/2011 | Bayesteh et al. | 375/267 |
| 2011/0194504 A1* | 8/2011 | Gorokhov et al. | 370/329 |
| 2012/0039273 A1* | 2/2012 | Nam et al. | 370/329 |
| 2012/0182899 A1* | 7/2012 | Mujtaba et al. | 370/252 |
| 2012/0188881 A1* | 7/2012 | Ma et al. | 370/252 |
| 2012/0207055 A1* | 8/2012 | Kang et al. | 370/252 |

FOREIGN PATENT DOCUMENTS

| | | |
|---|---|---|
| CN | 101577610 A | 11/2009 |
| WO | 2007105928 A1 | 9/2007 |
| WO | 2007112371 A1 | 10/2007 |
| WO | 2008031037 A2 | 3/2008 |
| WO | 2008115111 A1 | 9/2008 |
| WO | 2008150114 A1 | 12/2008 |

OTHER PUBLICATIONS

Schellmann, et al.: "Spatial Transmission Mode Switching in Multiuser MIMO-OFDM Systems With User Fairness"; IEEE Transactions on Vehicular Technology, vol. 59, No. 1, Jan. 2010; pp. 235-247.

* cited by examiner

CHANNEL STATE INFORMATION FEEDBACK METHOD AND USER EQUIPMENT

CROSS REFERENCE RELATED APPLICATIONS

This application is a national phase of PCT/CN2010/074743 filed Jun. 29, 2010, which claims priority to China Application Serial No. 201010002248.3, filed Jan. 12, 2010, both of which are entirely incorporated herein by reference.

TECHNICAL FIELD

The present invention relates to digital communication field, and particularly to a method for feeding back channel state information and user equipment.

BACKGROUND OF THE RELATED ART

In a Long Term Evolution (LTE) system, there are three ways to reflect downlink physical Channel State Information (CSI): Channel Quality Indication (CQI), Pre-coding Matrix Indicator (PMI), Rank Indicator (RI).

The CQI is one indicator used for measuring downlink channel quality. The CQI is denoted by an integer value which represents different CQI grade respectively in a range of 1~15 in 36-213 protocol, wherein the different CQI corresponds to its respective Modulation and Coding Scheme (MCS), and there are totally 16 conditions, which may be represented by 4 bits of information, as shown in TABLE 1.

PMI indicates that the User Equipment (UE) informs an eNode B (eNB) what a pre-coding matrix should be used to perform pre-coding on a PDSCH channel sent to the UE according to measured channel quality only in a transmission mode of closed loop space multiplexing, while RI is used for UE feeding back the number of layers for downlink transmission to eNB. A feedback granularity of PMI may be that the entire bandwidth feed back one PMI, or feed back PMI according to subband.

RI is used to describe the number of space separate channels, which corresponds to the rank of a channel response matrix. In a mode of open loop space multiplexing and closed loop space multiplexing, a UE is needed to feed back RI information, and there is no need to feed back RI information in other modes. The rank of the channel matrix corresponds to the number of layers of the channel matrix.

A transmission layer is a concept of multi-antenna "layer" in LTE and LTE-A, which denotes the number of valid separate channels in space multiplexing, and corresponds to antenna ports one by one in version 10, wherein an antenna port in version 10 is a logic port, and the total number of the transmission layers is RI. In addition in IEEE802.16m, a layer corresponds to a concept of "MIMO stream", which has same physical meanings.

TABLE 1

Relation between CQI index and MCS

| CQI index | Modulation mode | Coding rate × 1024 | efficiency |
|---|---|---|---|
| 0 | | excess | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |

TABLE 1-continued

Relation between CQI index and MCS

| CQI index | Modulation mode | Coding rate × 1024 | efficiency |
|---|---|---|---|
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In the LTE system, the feedback of CQI/PMI, RI may be a periodic feedback, or may be a non-periodic feedback, and the specific feedbacks are as shown in TABLE 2. Wherein, for periodic feedback CQI/PMI, RI, if UE needs not to send data, then the periodic feedback CQI/PM, RI are transmitted in a Physical Uplink Control Channel in a format of 2/2a/2b (in PUCCH format2/2a/2b), and if the UE needs to send data, then CQI/PMI, RI are transmitted in a Physical Uplink Shared Channel (PUSCH); and for non-periodical feedback CQI/PMI, RI, they are transmitted only in PUSCH.

TABLE 2

Uplink physical channels corresponding to periodic feedbacks and non-periodic feedbacks

| Scheduling mode | Periodic CQI report channel | Non-periodic CQI report channel |
|---|---|---|
| Frequency non-selective | PUCCH | |
| Frequency selective | PUCCH | PUSCH |

In a LTE system, in different transmission modes, payload sizes of periodic CQI/PMI, RI transmitted in PUCCH channel are different, however, the biggest payload size is 11 bits. In a periodic feedback, a Reed-Muller (20, A) is adopted firstly to code M (M<=11) bits of CQI/PMI, RI to be fed back, and then the modulation is performed on coded bits, and they are transmitted in the form of PUCCH format 2/2a/2b.

As an evolution standard of LTE, the Long Term evolution Advanced (LTE-A) needs to support a greater system bandwidth (up to a maximum of 100 MHz), and an average spectral efficiency and a spectral efficiency of a cell edge user need to be enhanced, for this reason, the LTE-A system introduces many new technologies: (1) a downlink high-order Multiple Input Multiple Output (MIMO), the LTE system supports 4-antenna transmission at most in downlink, while an introduction of high-order MIMO make the LTE-A system support 8-antenna transmission at most in downlink, and then the dimensions of the channel state matrix increase; (2) Coordinated Multiple Point Transmission (CoMP), which is the coordinated transmission by utilizing multiple cell transmission antennas, the UE may need to feed back the channel state information of multiple cells.

By using multiple antennas at the sender (eNB), we may enhance transmission rate by way of space multiplexing, that is, different data are transmitted in different antenna locations in the same time-frequency resources of the sender, and by using multiple antennas at receiver (UE), we may distribute all of the antenna resources to the same user in the case of single user, and this transmission form is called as Single-User MIMO (SU-MIMO), in addition, we may also distribute resources of different antenna spaces to different users in the case of multiple users, and this transmission form is called as Multiple-User MIMO (MU-MIMO). In a single transmission mode, eNB may dynamically select the downlink SU-MIMO transmission or downlink MU-MIMO transmission according to reported channel state information, which we call as SU/MU MIMO dynamic switching.

A general process flow for dynamic switching transmission modes of single-user MIMO and multiple-user MIMO will be described as follows:

At first, a sender sends the pilot to user equipment in order for user equipment measuring downlink channel state, and the user equipment estimates the downlink channel according to the received pilot information, and the user equipment determines a format of feedback channel state information and reports the channel state information, and then the eNB selects a transmission mode of downlink SU-MIMO or a transmission mode of MU-MIMO dynamically according to the reported channel state information, and communicates according to the selected transmission mode.

For a dynamic switching transmission mode of single-user MIMO and multiple-user MIMO, on one hand, it keeps backward compatibility to support SU-MIMO as a priority principle and be compatible with a feedback form of CQI/PMI/RI of R8 as possible, on other hand, it needs to take into account forward compatibility to support MU-MIMO and COMP, ensuring that the new technology has acceptable performances. And there is a lack of mechanism for reporting overall and effective channel state information in a SU-MIMO and MU-MIMO dynamic switching system in the existing technology, causing that the eNB can not correctly select a downlink channel used when sending data to the UE, thereby causing that a fast switching of two transmission forms of SU-MIMO and MU-MIMO is not supported, reducing the work efficiency of the system.

SUMMARY OF THE INVENTION

The present invention provides a method for feeding back channel state information and a user equipment thereof, to solve a problem of lacking a mechanism of reporting overall and effective channel state information in a SU-MIMO and MU-MIMO dynamic switching system.

A method for feeding back channel state information, comprising:

in a single transmission mode, UE sending channel state information to the network side, which comprises information indicating a transmission layer with best channel quality.

The single transmission mode is a SU-MIMO transmission mode, or a MU-MIMO transmission mode, or a mixed transmission mode of the SU-MIMO and the MU-MIMO.

The information indicating the transmission layer with best channel quality is a preset fixing location of the best transmission layer, before the step of the UE sending channel state information to the network side, the method further comprises:

setting a fixing location of the best transmission layer.

The information indicating the transmission layer with best channel quality is a CQI report, and the CQI report comprises a CQI of each transmission layer, before the step of the UE sending channel state information to the network side, the method further comprises:

generating the CQI report according to the CQI of each transmission layer.

The information indicating the transmission layer with best channel quality includes average CQIs of different transmission layer sets and a differential CQI between a CQI of each transmission layer and an average CQI of transmission layer set to which said each transmission layer belongs, before the step of UE sending channel state information to the network side, the method further comprises:

dividing the transmission layer into at least two transmission layer sets;

obtaining an average CQI of each transmission layer set respectively; and obtaining the differential CQI between the CQI of each transmission layer and the average CQI of the transmission layer set to which each transmission layer belongs according to the average CQI of each transmission layer set.

The information indicating the transmission layer with best channel quality is an uplink indication signaling, before the step of the UE sending channel state information to the network side, the method further comprises:

the UE judging a best transmission layer, and generating the uplink indication signaling according to the determination result, indicating the network side to transmit data according to using the best transmission layer.

The information indicating the transmission layer with best channel quality comprises an uplink indication signaling and the average CQI of each transmission layer set, before the step of the UE sending channel state information to the network side, the method further comprises:

dividing the transmission layer into at least two transmission layer sets;

obtaining an average CQI of each transmission layer respectively; and the UE selecting the best transmission layer from the transmission layer set with the highest average CQI, and generating an uplink indication signaling according to a selection result.

The present invention further provides a User Equipment (UE), in a single transmission mode comprising:

an information feedback module, which is configured to: send channel state information to the network side, wherein the channel state information comprises information indicating a transmission layer with best channel quality.

The above UE further comprises:

a first information generating module, which is configured to: generate channel state information according to a preset fixing location of best transmission layer;

a second information transmission module, which is configured to: obtain a CQI report according to the CQI of each transmission layer, and generate channel state information according to the CQI report; or calculate average CQIs of different transmission layer sets and a differential CQI between the CQI of each transmission layer and the average CQI of the transmission layer set to which said each transmission layer belongs, and generate channel state information according to a calculation result;

a third information transmission module, which is configured to: generate an uplink indication signaling, and generate channel state information according to the uplink indication signaling; and a fourth information transmission module, which is configured to: generate channel state information according to the uplink indication signaling and the average CQI of each transmission layer set.

Embodiments of the present invention provide a method for feeding back channel state information and user equipment thereof, when the user equipment sends channel state information to a network side, an indication of selecting the best transmission layer is carried in the information, to indicate the network side to send data to the user equipment by the best transmission layer, thus when the network side determines to adopt a MU-MIMO, it may determine a best transmission layer quickly according to the indication for selecting the best transmission layer in the channel state information, thereby enhancing the transmission efficiency and transmission quality, and solving the problem of lacking a mechanism of reporting overall and effective channel state information in a SU-MIMO and MU-MIMO dynamic switching system.

PREFERRED EMBODIMENTS OF THE PRESENT INVENTION

Figure 1:
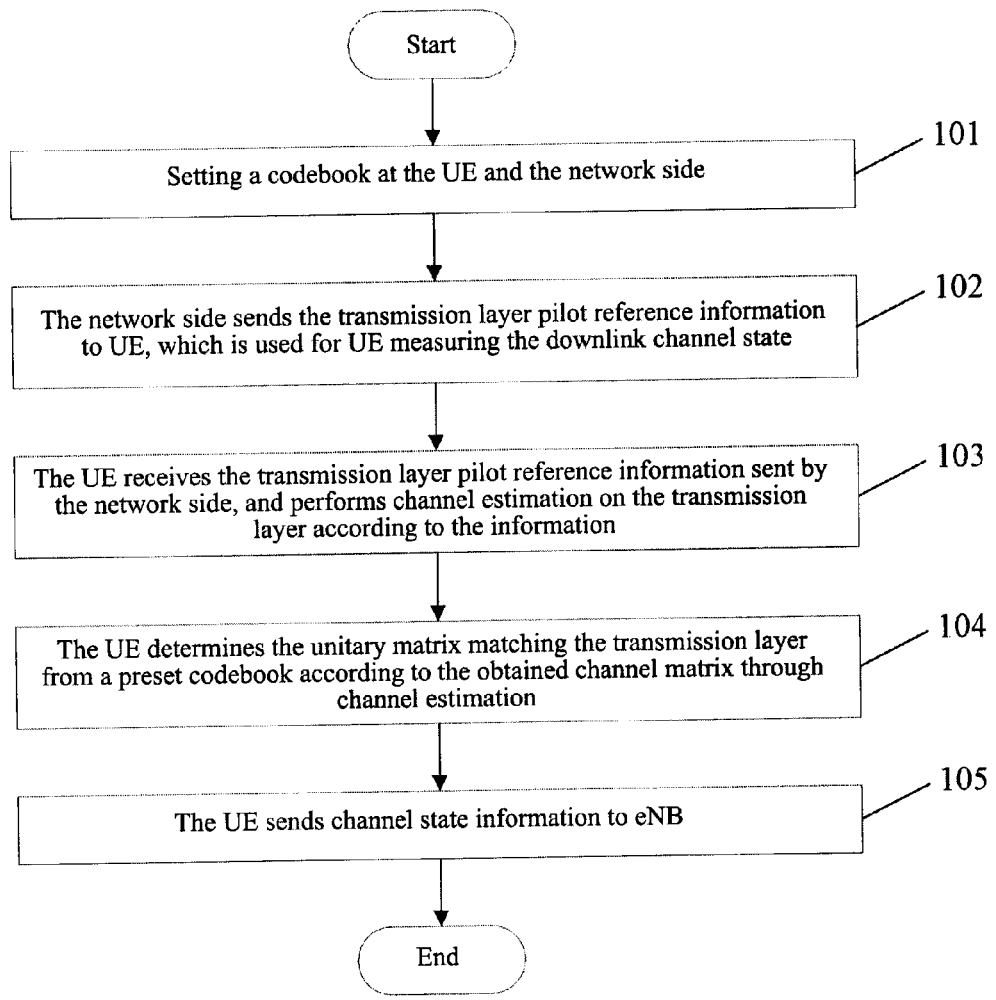
FIG. 1 is a flowchart of a method for feeding back channel state information provided by embodiment 5 of the present invention.

In order to obtain a higher peak spectral efficiency in an LTE-A system, a dynamic switch of single-user MIMO and multiple-user MIMO needs to be supported in downlink, and on one hand, a feedback control signaling of channel information needs to keep a backward compatibility, to take SU-MIMO as a priority principle and be compatible with a feedback form of CQI/PMI/RI of the existing Release 8 as possible; on other hand, the feedback control signaling of the channel information needs to take a forward compatibility into account, considering a support to MU-MIMO and COMP, to ensure that the new technology has acceptable performances.

In order to implement reporting overall and effective channel state information in a SU-MIMO and MU-MIMO dynamic switching system, embodiments of the present invention provide a method for feeding back channel state information.

Embodiment 1 of the present invention will be described as follows.

An embodiment of the present invention provides a method for feeding back channel state information, comprising: in a single transmission mode, a UE sending channel state information to a network side eNB, the channel state information comprising information indicating a transmission layer with best channel quality.

Further, the signal transmission mode is a transmission mode of SU-MIMO or MU-MIMO, or a mixed transmission mode of SU-MIMO and MU-MIMO.

Further, the information indicating the transmission layer with best channel quality carries out indication by way of fixing a best layer location, for example fixing the first layer as the best layer, or fixing the first and second layer as the best layers.

Further, the information indicating the transmission layer with best channel quality is specifically a pre-coding matrix index (PMI) of a right unitary matrix of a channel matrix, before the step of the UE sending the channel state information to the network side, the method further comprises:

the UE obtains a channel matrix according to the channel estimation, and the UE determines a pre-coding matrix index PMI from a preset codebook, so that the first transmission layer indicated by the PMI has a best channel quality or the transmission layers corresponding to the first and second transmission layers indicated by the PMI have the best and the second best channel quality.

Further, the UE determining a unitary matrix matching the transmission layer from the preset codebook according to the obtained channel matrix through channel estimation comprises:

a singular value decomposition is performed on the channel matrix to obtain a right unitary matrix and a diagonal matrix of the channel matrix, and the singular value of the first column of the diagonal matrix is the maximum, the corresponding singular values of various columns decrease sequentially in an order of column;

one unitary matrix which is closest to the right unitary matrix is selected as the unitary matrix matching the transmission layer from the preset codebook, and its corresponding index is the pre-coding matrix index.

Further, the UE determining a unitary matrix matching the transmission layer from the preset codebook according to the obtained channel matrix through channel estimation comprises:

performing a singular value decomposition on the channel matrix to obtain the right unitary matrix of the channel matrix;

performing a full permutation on each column vector of the right unitary matrix, and quantizing combinations of various sequencing respectively;

selecting a combination with minimum quantization error as a final right unitary matrix, and selecting one unitary matrix closest to the right unitary matrix as the unitary matrix matching the transmission layer from the preset codebook.

More specifically, for example in a LTE-A system, in a transmission mode of SU/MU MIMO dynamic switching, the UE determines 4 transmission layers and fixes the first transmission layer as the best transmission layer, or fixes the first and the second transmission layers as the best and the second best transmission layers respectively.

Embodiment 2 of the present invention will be described in detail as follows.

A method for feeding back channel state information comprises: in a single transmission mode, UE sending channel state information to a network side eNB, wherein the channel state information comprises information indicating a transmission layer with best channel quality.

Further, the information indicating the transmission layer with best channel quality refers to a CQI report, and the UE determines the channel quality information CQI of each transmission layer by a CQI report, and indicates which layer is the best according to the CQI of each transmission layer, and the UE sends the CQI report to the eNB.

Furthermore, the CQI report comprises the CQI of each layer, and a transmission layer with the maximum CQI is the best layer.

Furthermore, average CQIs of different transmission layer sets and the differential CQI between CQI of each transmission layer and the average CQI of the transmission layer set to which said each transmission layer belongs are calculated, the transmission layer with the maximum differential CQI in the transmission layer set with the maximum average CQI is the best layer.

Furthermore, the UE firstly determines the total number of layers of a single user MIMO as r, and then the UE determines an average channel quality CQI_1 of transmission layers 1 to ceil(r/2) and an average channel quality CQI_2 of transmission layers floor(r/2) to r, and determines differential CQIs between each transmission layer from 1 to ceil(r/2) and CQI_1 and differential CQIs between each transmission layer from floor(r/2) to r and CQI_2. Herein r is a positive integer greater than 1, ceils represents rounding up, and floor represents rounding down.

More specifically, for example in a LTE-A system, in a transmission mode of SU/MU MIMO dynamic switching, a UE determines 4 transmission layers, each of which has one CQI, $CQI_1$, $CQI_2$, $CQI_3$ and $CQI_4$ respectively. Assuming that $CQI_3$ is the maximum, then it indicates that the third transmission layer is the best transmission layer. Assuming that $CQI_3$ is the maximum and $CQI_1$ is the second maximum, then it indicates that the third transmission layer and the first transmission layer are the best and the second best transmission layers respectively.

Embodiment 3 of the present invention will be described in detail as follows.

A method for feeding back channel state information comprises: in a single transmission mode, UE sending channel state information to a network side eNB, the channel state information comprising information indicating a transmission layer with best channel quality.

Further, the information indicating the transmission layer with best channel quality refers to adding an uplink indication signaling, and the UE sending the uplink indication signaling together with the reported additional uplink indication signaling and other channel state information to eNB.

Furthermore, the channel state information comprises the added additional uplink indication signaling with log 2(combnk(r,1)) bits, indicating the location of the best layer in transmission layers 1 to r. Herein, the total number of layers of a single user MIMO is r, and r is a positive integer greater than 1, and combnk(n,j) denotes a combinatorial number of taking j from n, wherein n and j are positive integers greater than or equal to 1, and n is greater than or equal to j.

More specifically, for example in a LTE-A system, in a transmission mode of SU/MU MIMO dynamic switching, the UE determines 8 transmission layers, and the added additional uplink indication signalings are composed of 3 bits, b1, b2, b3 respectively, the meanings of different uplink indication signalings are as shown in TABLE 3.

TABLE 3

| Relation between the additional uplink indication signaling and the best layer | |
|---|---|
| b1, b2, b3 | The indicated best layer |
| 000 | The first transmission layer |
| 001 | The second transmission layer |
| 010 | The third transmission layer |
| 011 | The fourth transmission layer |
| 100 | The fifth transmission layer |
| 101 | The sixth transmission layer |

TABLE 3-continued

| Relation between the additional uplink indication signaling and the best layer | |
|---|---|
| b1, b2, b3 | The indicated best layer |
| 110 | The seventh transmission layer |
| 111 | The eighth transmission layer |

Embodiment 4 of the present invention will be described in detail as follows.

A method for feeding back channel state information comprises: in a single transmission mode, UE sending channel state information to a network side eNB, the channel state information comprising information indicating a transmission layer with best channel quality.

Further, the information indicating a transmission layer with best channel quality refers to an uplink indication signaling, and the UE sends the uplink indication signaling together with the reported additional uplink indication signaling and other channel state information to an eNB.

Furthermore, the channel state information comprises an uplink indication signaling and average CQIs of different transmission layer sets, and the uplink indication signaling is used to indicate the transmission layer with best channel quality in the transmission layer set with maximum average CQI as the best transmission layer of all layers.

Furthermore, the average CQIs of different transmission layer sets are the average channel quality CQI_1 of transmission layers 1 to ceil(r/2) and the average channel quality CQI_2 of transmission layers floor(r/2) to r.

Furthermore, when r=1, 2, the number of additional indication signalings is 0; when r=3, 4, the number of the additional indication signalings is 1; when r=5, 6, 7, 8, the number of the additional indication signalings is 2.

Furthermore, if CQI_1 is less than or equal to CQI_2, then the best transmission layer appears in transmission layers floor(r/2) to r, the additional uplink indication signaling with log 2(combnk(ceil(r/2),1)) bits is used to indicate the location of the best layer of them; if CQI_1 is greater than CQI_2, then the best transmission layer appears in transmission layers 1 to ceil(r/2), the additional uplink indication signaling with log 2(combnk(ceil(r/2),1)) bits is used to indicate the location of the best layer of them; herein, a UE firstly determines that the total number of layers of the single user MIMO is r, and r is a positive integer greater than 1, ceil denotes rounding up, floor denotes rounding down, combnk(n,j) denotes a combinatorial number of taking j from n, wherein n and j are positive integers greater than or equal to 1, and n is greater than or equal to j.

Furthermore, the UE determines an average channel quality CQI_1 of transmission layers 1 to ceil(r/2) and an average channel quality CQI_2 of transmission layers floor(r/2) to r, and if CQI_1 is less than CQI_2, then the best transmission layer appears in transmission layers floor(r/2) to r, the additional uplink indication signaling with log 2(C(ceil(r/2),1)) bits is used to indicate the location of the best layer; if CQI_1 is greater than or equal to CQI_2, then the best transmission layer appears in transmission layers 1 to ceil(r/2), the additional uplink indication signaling with log 2(C(ceil(r/2),1)) bits is used to indicate the location of the best layer; herein, the UE firstly determines that the total number of layers of a single user MIMO is r, wherein r is a positive integer greater than 1, ceils denotes rounding up, floor denotes rounding down, combnk (n,j) denotes a combinatorial number of taking j from n, wherein n and j are positive integers greater than or equal to 1 and n is greater than or equal to j.

More specifically, for example in a LTE-A system, in a transmission mode of SU/MU MIMO dynamic switching, the UE determines 8 transmission layers, and there is one average channel quality indication information CQI-1 in layers 1-4, and there is one average channel quality indication information CQI-2 in layers 5-8. Besides CQI-1, CQI-2 and so on, the channel state information further comprises an additional signaling with 2 bits which is used to indicate the biggest transmission layer in different transmission layer sets.

Assuming that CQI-1>CQI-2, the additional uplink indication signaling are $b_1$, $b_2$, the meaning of each uplink indication signaling is as shown in TABLE 4.

TABLE 4

Relation between the additional uplink indication signaling and the best layer

| b1, b2 | The indicated best layer |
|---|---|
| 00 | The first transmission layer |
| 01 | The second transmission layer |
| 10 | The third transmission layer |
| 11 | The fourth transmission layer |

Assuming that CQI-2>CQI-1, the additional signaling are $b_1$, $b_2$, herein the meaning of each uplink indication information is as shown in TABLE 5.

TABLE 5

Relation between the additional uplink indication signaling and the best layer

| b1, b2 | The indicated best layer |
|---|---|
| 00 | The fifth transmission layer |
| 01 | The sixth transmission layer |
| 10 | The seventh transmission layer |
| 11 | The eighth transmission layer |

Embodiment 5 of the present invention will be described in combination with drawings as follows.

Embodiment 5 of the present invention provides a method for feeding back channel state information, by carrying an indication of selecting the best transmission layer in the channel state information, it solves a problem of lacking a mechanism of reporting overall and effective channel state information in a SU-MIMO and MU-MIMO dynamic switching system. In an embodiment of the present invention, the indication of selecting the best transmission layer is specifically a PMI of a unitary matrix, and a network side device is specifically a data sender (such as eNB), a UE is specifically a UE. A flowchart of implementing channel state information feedback by using the method is as shown in FIG. 1, comprising:

in step 101, a codebook is set at the UE and the network side.

In an embodiment of the present invention, 16 u vectors defined by LTE when there are 4 antennas are nearly distributed uniformly in n-dimension space.

n refers to size of each u vector herein, that is n=4. It means herein that, 16 typical u vectors denotes $[a_1\ a_2\ a_3\ a_4]^T$ vector through quantization, wherein $a_1, a_2, a_3, a_4$ are arbitrary complexes, and $[a_1\ a_2\ a_3\ a_4]^T [a_1\ a_2\ a_3\ a_4]=1$.

16 codebooks as shown in TABLE 3 is generated based on Householder transform Expression 1 of u vector.

$$W_n = I - 2u_n u_n^H / u_n^H u_n \qquad \text{Expression 1}$$

Wherein, I is a unit matrix of 4*4, assuming that the number of receiving antennas of a certain UE is 4, then 4 transmission layers exist between the UE and the eNB, so the rank is 4, and the codebook includes 16 quantized unitary matrixes according to TABLE 3, the size of each unitary matrix is 4*4, the UE and the eNB have the same codebook.

In step 102, the network side sends the transmission layer pilot reference information to UE, which is used for UE measuring the downlink channel state;

in step 103, the UE receives the transmission layer pilot reference information sent by the network side, and performs channel estimation on the transmission layer according to the information;

in step 104, the UE determines the unitary matrix matching the transmission layer from a preset codebook according to the obtained channel matrix through channel estimation;

in step 103, after performing the channel estimation on the entire transmission layers, the UE obtains a channel matrix H, and in this step, the UE performs Singular Value Decomposition (SVD) on H according to Expression 2, and obtains a left unitary matrix U, a right unitary matrix V and a diagonal matrix $\Sigma$, and ensures that each singular value of the diagonal matrix $\Sigma$ satisfies $|\sigma_1| \geq |\sigma_2| \geq |\sigma_3| \geq |\sigma_4|$.

$V=[v_1, v_2, v_3, v_4]$, according to the right unitary matrix V, one closest unitary matrix is selected from 16 unitary matrixes of the codebook, and an index PMI of the unitary matrix is obtained.

$$H = U\Sigma V^H \qquad \text{Expression 2}$$

$$= [u_1, u_2, u_3, u_4] \begin{bmatrix} \sigma_1 & 0 & 0 & 0 \\ 0 & \sigma_2 & 0 & 0 \\ 0 & 0 & \sigma_3 & 0 \\ 0 & 0 & 0 & \sigma_4 \end{bmatrix}$$

$$[v_1, v_2, v_3, v_4]^H$$

By determining a size relation between the above SVD and an absolute value of the singular value, a PMI with implicit reflection relation is obtained, which may ensure that the best one or two column vectors are always located at the first one column or the first two columns of the right unitary matrix corresponding to the PMI.

In step 105, the UE sends channel state information to eNB;

in this step, the UE sends channel state information to eNB, and the channel state information includes a PMI, one or two CQIs and RIs, Thus, after receiving channel state information sent by the UE, eNB may obtain a corresponding unitary matrix from a locally stored preset codebook according to the PMI therein, and thereby determines a best transmission layer according to an established column vector permutation order when the codebook is set.

Alternatively, in step 104, the unitary matrix may also be determined according to the following method:

First, the UE performs SVD on H to obtain a right unitary matrix $V=[v_1, v_2, v_3, v_4]$ of the channel matrix, and performs a full permutation on the unitary matrix according to different orders, and obtains possible 24 permutation modes as follows:

$V_1=[v_1, v_2, v_3, v_4]$
$V_2=[v_1, v_2, v_4, v_3]$
$V_3=[v_1, v_3, v_2, v_4]$
...
$V_{24}=[v_4, v_1, v_2, v_3]$

Assuming that there is a certain permutation $V_h=[v_i, v_j, v_k, v_l]$, and one closest unitary matrix $\tilde{V}_h=[\tilde{v}_i, \tilde{v}_j, \tilde{v}_k, \tilde{v}_l]$ is selected from 16 unitary matrixes of the codebook, so that the quantization error of the first column vector is minimum, and the quantization error of the column vector of the second column is the second smallest, that is, satisfying $d_{chord}(v_i, \tilde{v}_i) \leq d_{chord}(v_j, \tilde{v}_j) \leq d_{chord}(v_k, \tilde{v}_k), d_{chord}(v_l, \tilde{v}_l)$, wherein, i, j, k, l belong to set {1, 2, 3, 4}, and i, j, k, l are four different digits. Wherein, $d_{chord}(v_i, \tilde{v}_i)$ denotes a chord distance between vectors $v_i$ and $\tilde{v}_i$, $$d_{chord}(v_i, \tilde{v}_i) = \frac{1}{\sqrt{2}} \|v_i v_i^H - \tilde{v}_i \tilde{v}_i^H\|_{Frobenius},$$

an index PMI of the unitary matrix is obtained. Wherein, h is a positive integer belonging to set {1, 2, 3, ..., 24}. Thus, one unitary matrix with minimum quantization error is obtained as the unitary matrix of the UE.

in step 202, the UE receives the transmission layer pilot reference information sent by the network side, and performs channel estimation on the transmission layer according to the information;

in step 203, the UE determines a unitary matrix matching the transmission layer and CQI of each transmission layer from a preset codebook according to the obtained channel matrix through channel estimation;

in this step, the UE performs SVD on the channel matrix H obtained through the channel estimation according to Expression 2 to obtain a right unitary matrix $V=[v_1, v_2, v_3, v_4]$ of the channel matrix, and it selects one closest unitary matrix from 16 unitary matrixes of the codebook to obtain an index PMI of the unitary matrix.

Herein, the UE also needs to determine the channel quality indication information CQI of transmission layers corresponding to each column of the unitary matrix, and the embodiment of the present invention has 4 transmission layers, so there are 4 CQIs.

TABLE 6

Pre-coding codebook of downlink 4-antenna

| Codebook index | $u_n$ | Total number of layers υ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |

Embodiment 6 of the present invention will be described in combination with drawings as follows.

Embodiment 6 of the present invention provides a method for feeding back channel state information, by carrying an indication of selecting the best transmission layer in the channel state information, it solves a problem of lacking a mechanism of reporting overall and effective channel state information in a SU-MIMO and MU-MIMO dynamic switching system. In an embodiment of the present invention, the indication of selecting the best transmission layer is specifically a CQI report, and CQIs of entire transmission layers are included in the CQI report, a network side device is specifically a data sender (such as eNB), and a UE is specifically a UE.

In embodiment of the present invention, 16 u vectors defined by LTE when there are 4 antennas are nearly distributed in n-dimension space uniformly. 16 codebooks as shown in TABLE 3 are generated based on Householder transform Expression 1 of u vectors.

Figures 2, 3:
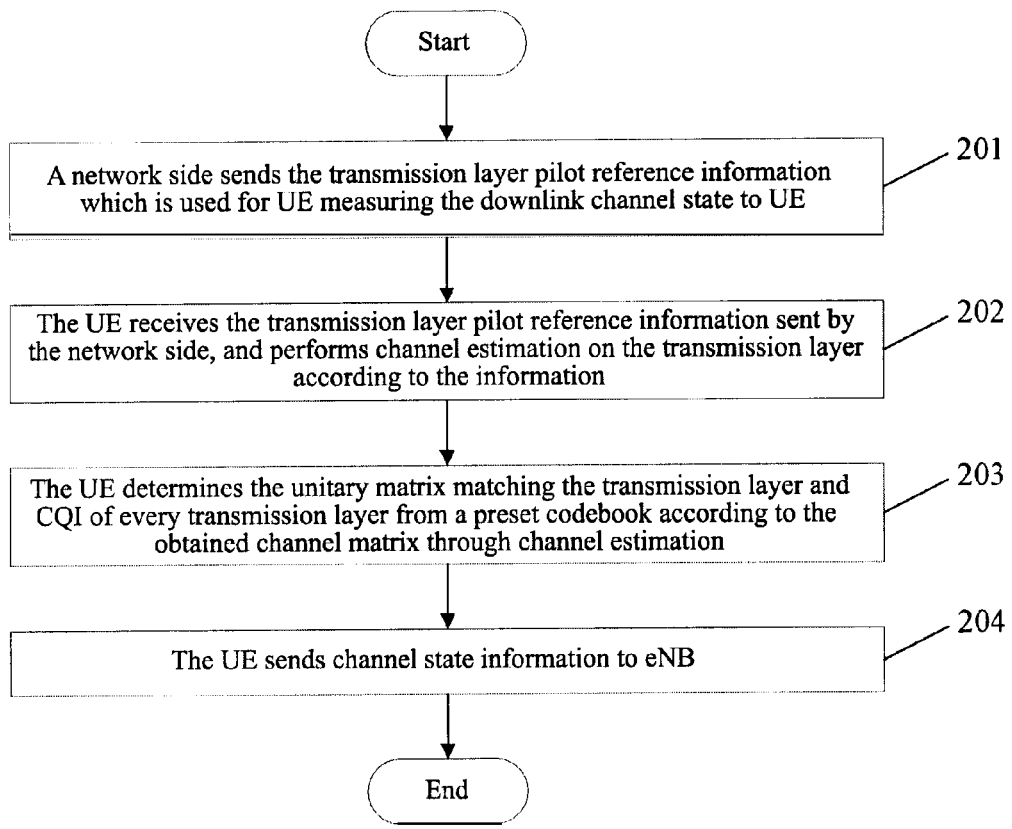
FIG. 2 is a flowchart of a method for feeding back channel state information provided by embodiment 6 of the present invention.
FIG. 3 is a structure schematic diagram of channel state information used in embodiment 6 of the present invention.

A flowchart of completing channel state information feedback by using a method for feeding back channel state information provided by an embodiment of the present invention is as shown in FIG. 2, comprising the following steps.

In step 201, a network side sends the transmission layer pilot reference information which is used for UE measuring the downlink channel state to UE;

In step 204, the UE sends the channel state information to eNB;

The structure of channel state information used in the embodiment of the present invention is as shown in FIG. 3.

In this step, the UE feeds back the PMI and 4 CQIs to the eNB.

After receiving the channel state information, eNB may determine the best transmission layer which may be used when performing MU-MIMO for the UE (that is, the transmission layer corresponding to the maximum CQI value). For example, CQIs of the four transmission layers are respectively $CQI_1$, $CQI_2$, $CQI_3$ and $CQI_4$, and $CQI_2 > CQI_1 > CQI_4 > CQI_3$, then the second column vector $\tilde{v}_2$ of the right unitary matrix V is the best column vector, and the second column $v_2$ of the matrix indicated by the PMI in the codebook is a quantization value of $v_2$, eNB may obtain the quantization information, thereby determining that the best transmission layer is the transmission layer corresponding to $v_2$.

It should be noted that, the quality of each transmission varies a lot according to different CQI values, so eNB may select a best transmission layer with best signal or multiple transmission layers with better signals to carry out transmission according to actual requirements when sending data to the UE by using MU-MIMO, which is not limited by the embodiment of the present invention.

In additional, when there are more transmission layers, the amount of data of CQI set of each transmission layer is larger, which requires to occupy much bandwidth resource, reducing the system transmission efficiency, so when there are more transmission layers (there exist 8 transmission layers, for example), the UE divides the transmission layer into different sets. For example, the 8 transmission layers are divided into two sets, and each set comprises 4 transmission layers, and the average CQI value of each set is obtained; the differential CQI value of each transmission layer is obtained respectively, specifically through the difference between the CQI of transmission layer and the average CQI of the set where the transmission layer is located to obtain the differential CQI value, and the differential CQI value of each transmission layer is taken as CQI report to be sent to eNB, and eNB judges which is a transmission layer with best channel quality according to the differential value of each transmission layer, in general, the transmission layer with maximum differential CQI in the set with highest average CQI is taken as the transmission layer with best channel quality.

Embodiment 7 of the present invention will be described in combination with drawings.

Embodiment 7 of the present invention provides a method for feeding back channel state information, by carrying an indication of selecting the best transmission layer in the channel state information, it solves a problem of lacking a mechanism of reporting overall and effective channel state information in a SU-MIMO and MU-MIMO dynamic switching system. In an embodiment of the present invention, the indication of selecting the best transmission layer is an uplink indication signaling, specifically a best layer index (BLI), and a network side device is specifically a data sender (such as eNB), a UE is specifically a UE.

In the embodiment of the present invention, 16 u vectors defined by LTE when there are 4 antennas are nearly distributed in n-dimension space uniformly. 16 codebooks as shown in TABLE 6 are generated based on Householder transform Expression 1 of u vectors.

Figures 4, 5:
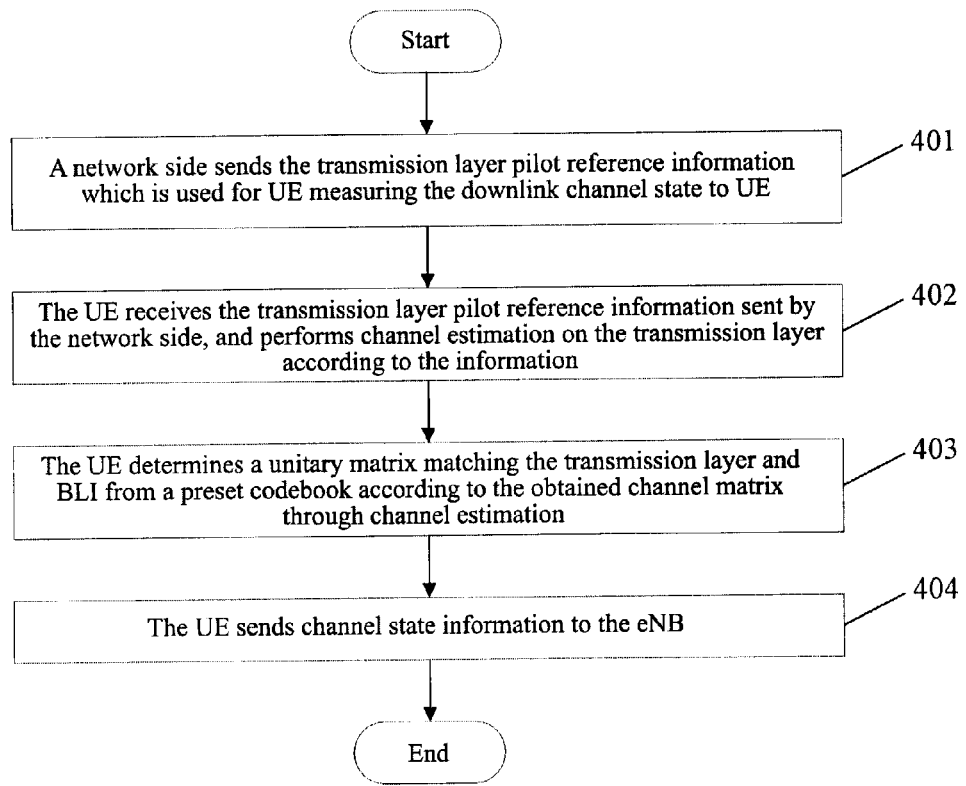
FIG. 4 is a flowchart of a method for feeding back channel state information provided by embodiment 7 of the present invention.
FIG. 5 is a structure schematic diagram of channel state information used in embodiment 7 of the present invention.

A flowchart of completing channel state information feedback by using a method for feeding back channel state information provided by an embodiment of the present invention is as shown in FIG. 4, comprising the following steps.

In step 401, a network side sends the transmission layer pilot reference information which is used for UE measuring the downlink channel state to UE;

in step 402, the UE receives the transmission layer pilot reference information sent by the network side, and performs channel estimation on the transmission layer according to the information;

in step 403, the UE determines a unitary matrix matching the transmission layer and BLI from a preset codebook according to the obtained channel matrix through channel estimation;

in this step, the UE performs SVD on the channel matrix H obtained from the channel estimation according to Expression 2, and obtains a right unitary matrix $V=[v_1, v_2, v_3, v_4]$ and a diagonal matrix of the channel matrix, and selects one closest unitary matrix from 16 unitary matrixes of the codebook to obtain an index PMI of the unitary matrix.

In addition, the BLI of the UE needs to be determined, and the BLI denotes the column index of the column vector corresponding to the absolute value of the maximum singular value in the unitary matrix corresponding to the PMI index.

For example, there exists an index with 2 bits, and 00 denotes that $v_1$ is the best column vector, 01 denotes that $v_2$ is the best column vector, 10 denotes that $v_3$ is the best column vector, 11 denotes that $v_4$ is the best column vector, and the transmission layer corresponding to the best column vector is the best transmission layer.

Indexes of multiple better column vectors may also be indicated in the BLI at the same time, for example, column indexes of the two column vectors of the absolute value of the maximum singular value and absolute value of the second maximum singular value corresponding to the BLI are provided. For example, there exists one index with 3 bits, 000 denotes that $v_1$, $v_2$ are two better column vectors, 001 denotes that $v_1$, $v_3$ are two better column vectors, 010 denotes that $v_1$, $v_4$ are two better column vectors, 011 denotes that $v_2$, $v_3$ are two better column vectors, 100 denotes that $v_2$, $v_4$ are two better column vectors, and 101 denotes that $v_3$, $v_4$ are two better column vectors.

It should be noted that, the best column vector corresponding to each value of the BLI is appointed when the system is initialized, that is, the eNB and the UE both know the best column vector represented by the BLI value and the corresponding transmission layer.

In step 404, the UE sends channel state information to the eNB;

The structure of channel state information used in the embodiment of the present invention is as shown in FIG. 5.

After receiving the channel state information, the eNB may determine that the best transmission layer (the transmission layer which the BLI index points to) which may be used when performing MU-MIMO on the UE.

Embodiment 8 of the present invention will be described in combination with drawings as follows.

Embodiment 8 of the present invention provides a method for feeding back channel state information, by carrying an indication of selecting the best transmission layer in the channel state information, it solves a problem of lacking a mechanism of reporting overall and effective channel state information in a SU-MIMO and MU-MIMO dynamic switching system. In an embodiment of the present invention, the indication of selecting the best transmission layer is specifically a BLI and a CQI report, and the CQI report includes the average CQI of each transmission layer set (average channel quality), and a network side device is specifically a data sender (such as eNB), a UE is specifically a UE.

In the embodiment of the present invention, 16 u vectors defined by LTE when there are 4 antennas are nearly distributed in n-dimension space uniformly. 16 codebooks as shown in TABLE 6 are generated based on Householder transform Expression 1 of u vectors.

Figure 6:
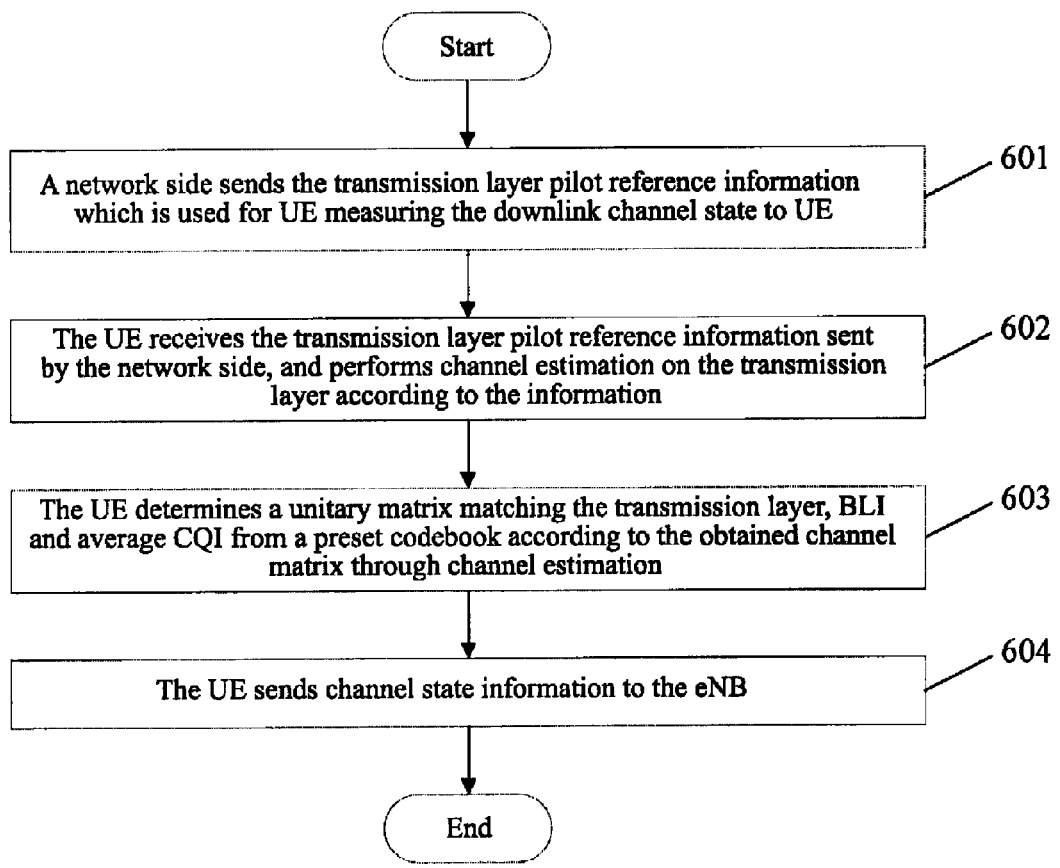
FIG. 6 is a flowchart of a method for feeding back channel state information provided by embodiment 8 of the present invention.

A flowchart of completing channel state information feedback by using a method for feeding back channel state information provided by an embodiment of the present invention is as shown in FIG. 6, comprising the following steps.

In step 601, a network side sends the transmission layer pilot reference information which is used for UE measuring the downlink channel state to UE;

in step 602, the UE receives the transmission layer pilot reference information sent by the network side, and performs channel estimation on the transmission layer according to the information;

in step 603, the UE determines a unitary matrix matching the transmission layer, BLI and average CQI from a preset codebook according to the obtained channel matrix through channel estimation;

in this step, the UE performs SVD on the channel matrix H obtained from the channel estimation according to Expression 2, and obtains a right unitary matrix $V=[v_1, v_2, v_3, v_4]$ and diagonal matrix $\Sigma$ of the channel matrix, and selects one closest unitary matrix from 16 unitary matrixes of the codebook to obtain an index PMI of the unitary matrix.

In addition, the BLI of the UE also needs to be determined, and the BLI denotes the column index of the column vector corresponding to the absolute value of the maximum singular value in the unitary matrix corresponding to the PMI index.

For example, there exists one index with 2 bits, 00 denotes that $v_1$ is the best column vector, 01 denotes that $v_2$ is the best column vector, 10 denotes that $v_3$ is the best column vector, 11 denotes that $v_4$ is the best column vector, and the transmission layer corresponding to the best column vector is the best transmission layer.

Indexes of multiple better column vectors may also be indicated in the BLI at the same time, for example, column indexes of the two column vectors of the absolute value of the maximum singular value and absolute value of the second maximum singular value corresponding to the BLI are provided. For example, there exists one index with 3 bits, 000 denotes that $v_1$, $v_2$ are two better column vectors, 001 denotes that $v_1$, $v_3$ are two better column vectors, 010 denotes that $v_1$, $v_4$ are two better column vectors, 011 denotes that $v_2$, $v_3$ are two better column vectors, 100 denotes that $v_2$, $v_4$ are two better column vectors, and 101 denotes that $v_3$, $v_4$ are two better column vectors.

In order to further improve the transmission efficiency, when there are more layers of the transmission layers, multiple transmission layers may be divided into different sets, and the average CQI of each set is obtained, and the set with higher average CQI is taken as the set where the transmission layer with best channel quality is located, and a BLI is constructed according to the set where the transmission layer with best channel quality is located, specifically referring to TABLE 4 and TABLE 5.

It should be noted that, the best column vector corresponding to each value of the BLI is appointed when the system is initialized, that is, the eNB and the UE both know the best column vector represented by the BLI value and the corresponding transmission layer.

In step 604, the UE sends channel state information to the eNB;

after receiving the channel state information, the eNB may firstly judge an average CQI of each set, and select a set with maximum average CQI, and finally determine the transmission layer with best channel quality according to the BLI from the set.

Figure 7:
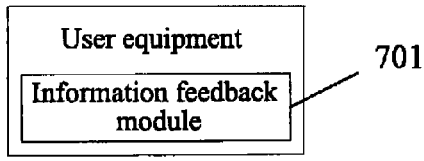
FIG. 7 is a structure schematic diagram of UE provided by an embodiment of the present invention.

An embodiment of the present invention also provides a UE, and the structure of the UE is as shown in FIG. 7, comprising:

a information feedback module 701, which is used to send channel state information to the network side, and the channel state information comprises information indicating transmission layers with best channel quality.

Figure 8:
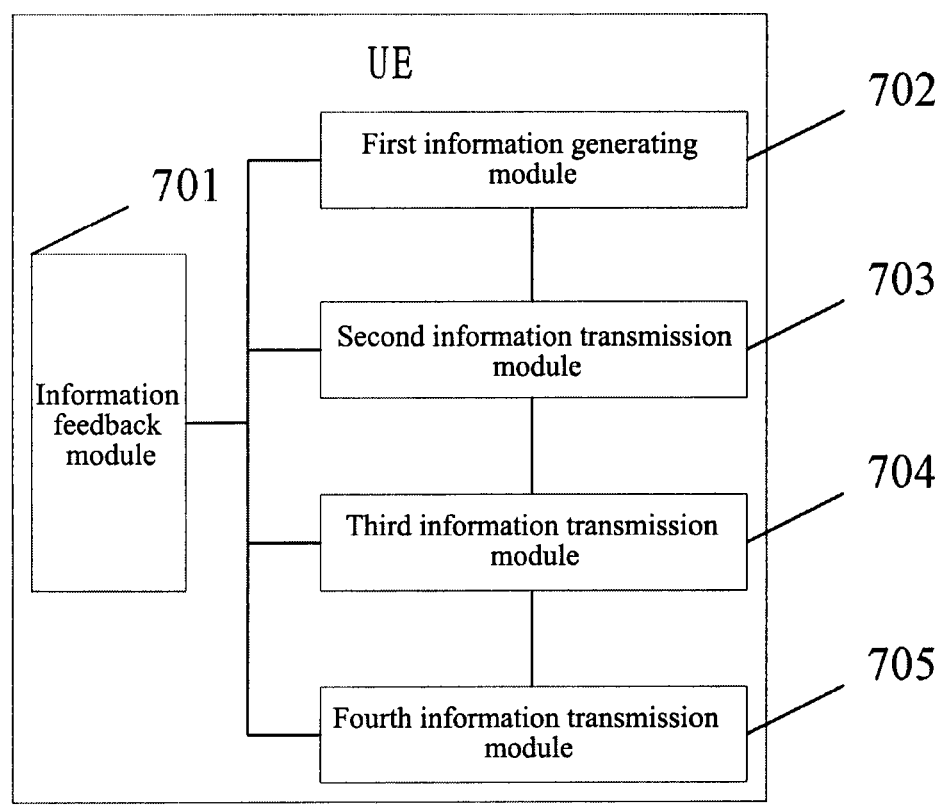
FIG. 8 is a structure schematic diagram of user equipment provided by another embodiment of the present invention.

Further, the above UE is as shown in FIG. 8, further comprising:

a first information generating module 702, which is used to generate channel state information according to a preset fixing location of best transmission layer;

a second information transmission module 703, which is used to obtain a CQI report according to the CQI of each transmission layer, and generate channel state information according to the CQI report;

the average CQIs of different transmission layer sets and the differential CQI between the CQI of each transmission layer and the average CQI of the transmission layer set to which the each transmission layer belongs are calculated, and channel state information is generated according to the calculation result;

a third information transmission module 704, which is used to generate a uplink indication signaling, and generate channel state information according to the uplink indication signaling;

a fourth information transmission module 705, which is used to generate channel state information according to the uplink indication signaling and the average CQI of each transmission layer set.

The above UE may be combined with a method for feeding back channel state information provided by the embodiment of the present invention, and when the UE sends channel state information to the network side, the information carries an indication of selecting the best transmission layer, indicating that the network side sends data to the UE through the best transmission layer, thus, when the network side determines to adopt MU-MIMO, it can determine the best transmission layer quickly according to the indication of selecting the best transmission layer in the channel state information, thereby enhancing the transmission efficiency and the transmission quality, solving the problem of lacking a mechanism of reporting overall and effective channel state information in a SU-MIMO and MU-MIMO dynamic switching system.

The ordinary people skilled in the art should understand that the all or part of steps in the above-mentioned method may be completed by program instructing relevant hardware, and the program may be stored in a computer readable storage medium such as a read only memory, a magnetic disk or a compact disk and so on. Alternatively, all or part of steps in the above-mentioned embodiments may also be implemented by using one or more integrated circuits. Correspondingly, each module/unit in the above-mentioned embodiments may be implemented in the form of hardware, or may be implemented in the form of software function module. The present invention is not limited to any specified form of the combination of hardware and software.

INDUSTRIAL APPLICABILITY

Embodiments of the present invention provide a method for feeding back channel state information and user equipment thereof, when the user equipment sends channel state information to a network side, an indication of selecting the best transmission layer is carried in the information, to indicate the network side to send data to the user equipment by the best transmission layer, thus when the network side determines to adopt a MU-MIMO, it may determine a best transmission layer quickly according to the indication for selecting the best transmission layer in the channel state information, thereby enhancing the transmission efficiency and transmission quality, and solving the problem of lacking a mechanism of reporting overall and effective channel state information in a SU-MIMO and MU-MIMO dynamic switching system.

What is claimed is:

1. A method for feeding back channel state information, comprising:

in a transmission mode of dynamic switching between a Single-User Multiple Input Multiple Output (SU-MIMO) transmission mode and a Multiple-User Multiple Input Multiple Output (MU-MIMO) transmission mode, user equipment (UE) sending the channel state information to a network side, which comprises a Precoding Matrix Indicator (PMI) indicating a precoding matrix transmission layer and information indicating for the MU-MIMO transmission mode a transmission layer with the best channel quality among all transmission layers indicated by the precoding matrix, to indicate the network side to send data to the UE by the transmission layer with the best channel quality when the network side determines to adopt the MU-MIMO transmission mode.

2. The method according to claim 1, wherein the information indicating the transmission layer with the best channel quality is a preset fixing location of the best transmission layer, before the step of the UE sending the channel state information to the network side, the method further comprises:
setting a fixing location of the best transmission layer, wherein the first transmission layer indicated by the precoding matrix has a best channel quality or the transmission layers corresponding to the first and second transmission layers indicated by the precoding matrix have the best and the second best channel quality.

3. The method according to claim 1, wherein the information indicating the transmission layer with the best channel quality is a Channel Quality Indication (CQI) report, and the CQI report comprises a CQI of each transmission layer, before the step of the UE sending the channel state information to the network side, the method further comprises:
generating the CQI report according to the CQI of all transmission layers of the SU MIMO transmission mode and the MU-MIMO transmission mode.

4. The method according to claim 1, wherein the information indicating the transmission layer with the best channel quality includes average CQIs of different transmission layer sets and a differential CQI between a CQI of each transmission layer and an average CQI of transmission layer set to which said each transmission layer belongs, before the step of the UE sending the channel state information to the network side, the method further comprises:
dividing transmission layers into at least two transmission layer sets;
obtaining the average CQI of each transmission layer set respectively; and
obtaining the differential CQI between the CQI of each transmission layer and the average CQI of the transmission layer set to which said each transmission layer belongs according to the average CQI of each transmission layer set.

5. The method according to claim 1, wherein the information indicating the transmission layer with the best channel quality is an uplink indication signaling, before the step of the UE sending the channel state information to the network side, the method further comprises:
the UE judging a best transmission layer, and generating the uplink indication signaling according to a judging result, indicating the network side to transmit data in the best transmission layer according to the signaling.

6. The method according to claim 1, wherein the information indicating the transmission layer with the best channel quality comprises an uplink indication signaling and an average CQI of each transmission layer set, before the step of the UE sending the channel state information to the network side, the method further comprises:
dividing transmission layers into at least two transmission layer sets;
obtaining the average CQI of each transmission layer; and
the UE selecting a best transmission layer from the transmission layer set with the highest average CQI, and generating the uplink indication signaling according to the selection result.

7. A user equipment (UE) applied to a transmission mode of dynamic switching between a Single-User Multiple Input Multiple Output (SU-MIMO) transmission mode and a Multiple-User Multiple Input Multiple Output (MU-MIMO) transmission mode, comprising:
an information feedback module, which is configured to: send channel state information to a network side, wherein the channel state information comprises a Precoding Matrix Indicator (PMI) indicating a precoding matrix and information indicating for the MU-MIMO transmission mode a transmission layer with the best channel duality among all transmission layers indicated by the precoding matrix, to indicate the network side to send data to the UE by the transmission layer with the best channel quality when the network side determines to adopt the MU-MIMO transmission mode.

8. The UE according to claim 7, further comprising:
a first information generating module, which is configured to: generate the channel state information according to a preset fixing location of the best transmission layer, wherein the preset fixing location of the best transmission layer is the information indicating for the MU-MIMO transmission mode a transmission layer with the best channel quality, and the first transmission layer indicated by the precoding matrix has a best channel quality or the transmission layers corresponding to the first and second transmission layers indicated by the preceding matrix have the best and the second best channel quality;
a second information transmission module, which is configured to obtain a Channel Quality Indication (CQI) report according to a CQI of all transmission layers of the SU-MIMO transmission mode and the MU-MIMO transmission mode, and generate the channel state information according to the CQI report, wherein the CQI report is the information indicating for the MU-MIMO transmission mode a transmission layer with the best channel quality; or
calculate average CQIs of different transmission layer sets and a differential CQI between the CQI of each transmission layer and an average CQI of transmission layer set to which said each transmission layer belongs, and generate the channel state information according to a calculation result, wherein the average CQIs of different transmission layer sets and the differential CQI is the information indicating for the MU-MIMO transmission mode a transmission layer with the best channel quality;
a third information transmission module, which is configured to: generate an uplink indication signaling, and generate the channel state information according to the uplink indication signaling, wherein the uplink indicating signaling is the information indicating for the MU-MIMO transmission mode a transmission layer with the best channel quality; and
a fourth information transmission module, which is configured to: generate the channel state information according to the uplink indication signaling and the average CQI of each transmission layer set, wherein the uplink indication signaling and the average CQI of each transmission layer set is the information indicating for the MU-MIMO transmission mode a transmission layer with the best channel quality.

* * * * *